United States Patent
Wang

(10) Patent No.: US 9,255,571 B2
(45) Date of Patent: Feb. 9, 2016

(54) AIR PUMP WITH TWO PRESSURE GAUGES FOR HIGH/LOW PRESSURE INDICATION

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 211 days.

(21) Appl. No.: 13/926,431

(22) Filed: Jun. 25, 2013

(65) Prior Publication Data

US 2014/0286796 A1    Sep. 25, 2014

(30) Foreign Application Priority Data

Mar. 20, 2013   (TW) .............................. 102109896 A

(51) Int. Cl.
*F04B 39/00* (2006.01)
*G01D 13/22* (2006.01)
*F04B 9/06* (2006.01)
*F04B 33/00* (2006.01)

(52) U.S. Cl.
CPC . *F04B 39/00* (2013.01); *F04B 9/06* (2013.01); *F04B 33/005* (2013.01); *G01D 13/22* (2013.01)

(58) Field of Classification Search
CPC ........ F04B 33/005; F04B 39/00; G01D 13/22
USPC ......... 417/63; 137/227, 565.25; 116/301, 300
See application file for complete search history.

(56) References Cited

U.S. PATENT DOCUMENTS

| | | | | |
|---|---|---|---|---|
| 2,394,987 A | * | 2/1946 | Deming | 73/714 |
| 2,717,573 A | * | 9/1955 | Murray | 116/301 |
| 5,167,250 A | * | 12/1992 | Barbieri | 137/227 |
| 5,779,457 A | * | 7/1998 | Chuang et al. | 417/467 |
| 2004/0001761 A1 | * | 1/2004 | Wu | 417/63 |

* cited by examiner

*Primary Examiner* — Nathan J Newhouse
*Assistant Examiner* — Christopher Bobish
(74) *Attorney, Agent, or Firm* — Muncy, Geissler, Olds & Lowe, P.C.

(57) ABSTRACT

An air pump includes an air pump body for pumping air, and a high pressure gauge and a low pressure gauge mounted in the air pump body for measuring and indicating the air pumped by the air pump body.

4 Claims, 8 Drawing Sheets

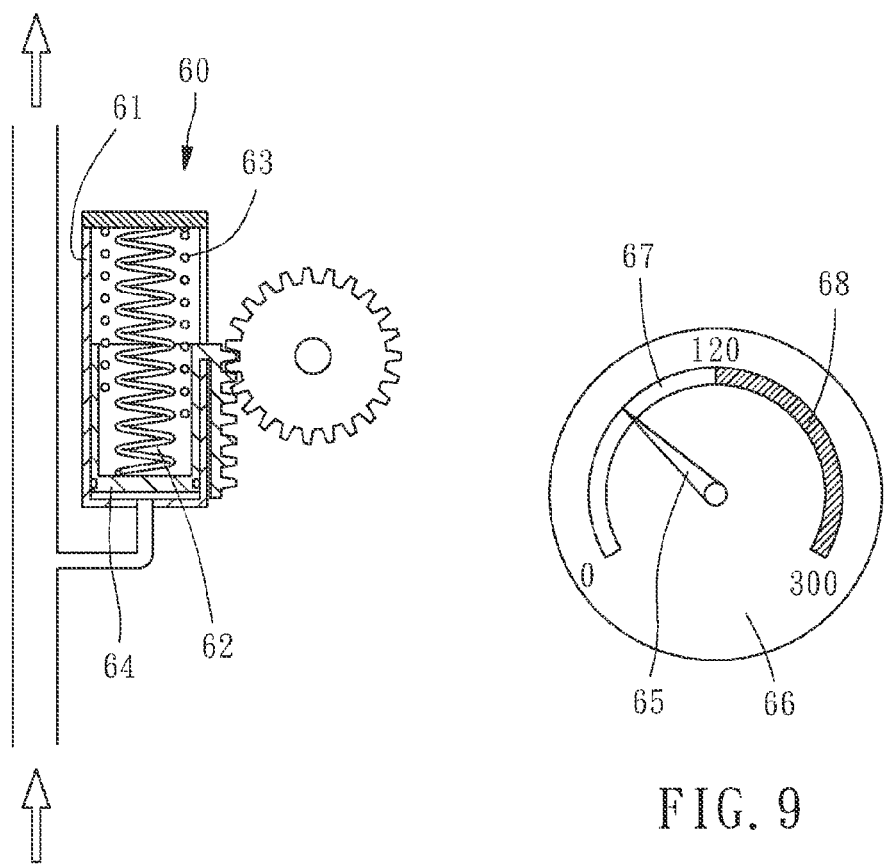

AIR PUMP WITH TWO PRESSURE GAUGES FOR HIGH/LOW PRESSURE INDICATION

BACKGROUND OF THE INVENTION

1. Field of the Invention

The present invention relates air pump technology and more particularly, to an air pump with two pressure gauges for high/low pressure indication.

2. Description of the Related Art

A regular air pump is generally equipped with one single pressure gauge for measuring and indicating a pumped air. A high capacity air pump needs to use a high pressure gauge for measuring and indicating a high pressure of pumped air. The graduated scale of a high pressure gauge has fine divisions. When a high pressure gauge is used to measure and indicate a low pressure of pumped air, the user cannot easily view and read the readings due to that the indicator moves slowly. At the initial stage of the pumping operation, the user may be unable to see the movement of the indicator, causing an illusion. For example, when a high pressure gauge for measuring 0-300 psi is used to measure the pressure of an inflatable object that requires air supply of only 120 psi, the aforesaid viewing and reading problem can occur.

SUMMARY OF THE INVENTION

The present invention has been accomplished under the circumstances in view. It is the main object of the present invention to provide an air pump with two pressure gauges for high/low pressure indication, which is practical for measuring and indicating a high pressure as well as a low pressure, and which facilitates user viewing and reading the readings when operated to measure a low pressure.

To achieve this and other objects of the present invention, an air pump with two pressure gauges for high/low pressure indication comprises an air pump body, a high pressure gauge mounted in the air pump body for measuring and indicating a high pressure, and a low pressure gauge mounted in the air pump body for measuring and indicating a low pressure.

BRIEF DESCRIPTION OF THE DRAWINGS

FIG. 8 is a schematic structural view of an air pump with two pressure gauges for high/low pressure indication in accordance with a fourth embodiment of the present invention is shown.

FIG. 9 is a schematic view of a part of the fourth embodiment of the present invention, illustrating the arrangement of the dial.

DETAILED DESCRIPTION OF THE INVENTION

Figure 1:
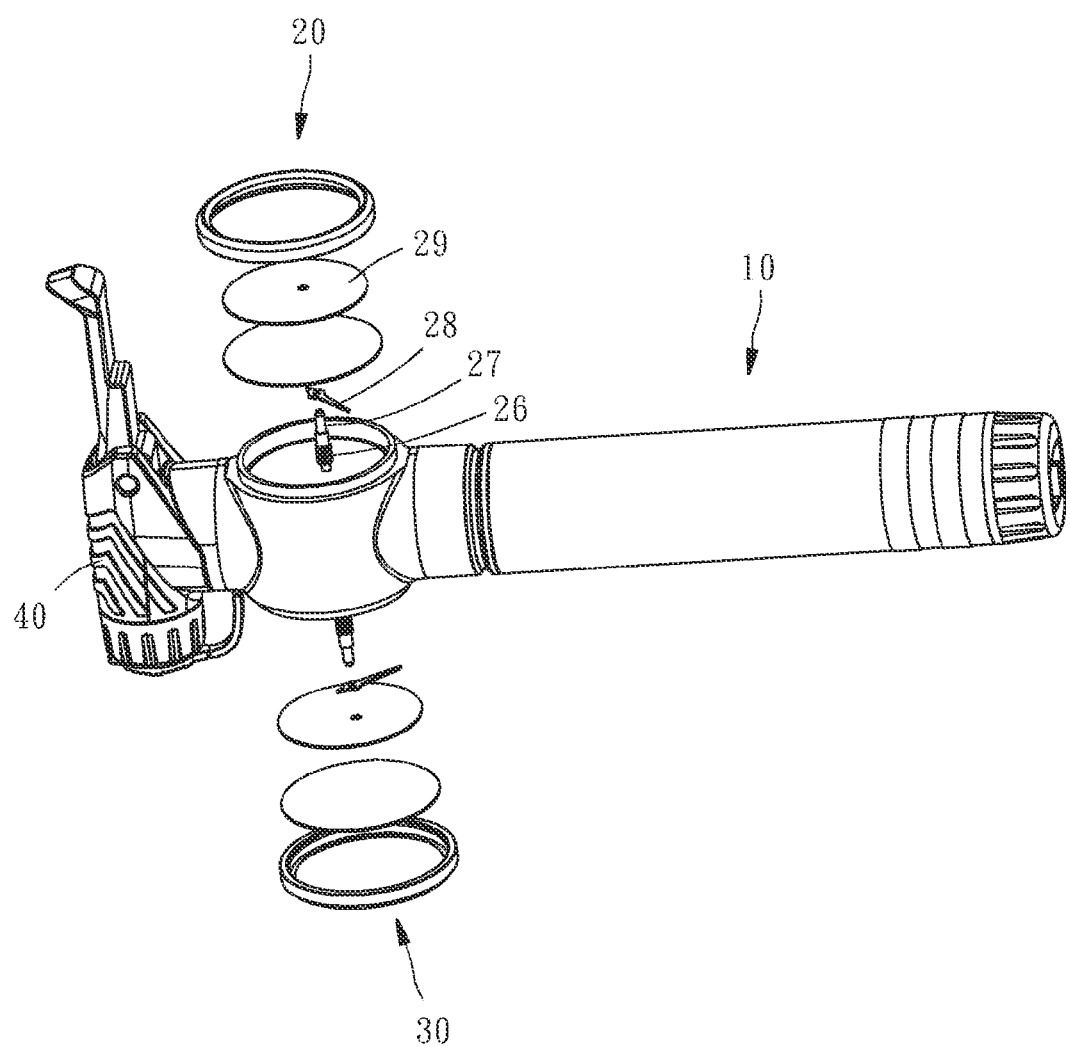
FIG. 1 is a partial exploded view of an air pump with two pressure gauges for high/low pressure indication in accordance with the present invention.

Retelling to FIGS. 1-4, an air pump with two pressure gauges for high/low pressure indication in accordance with a first embodiment of the present invention is shown. As illustrated, the air pump with two pressure gauges for high/low pressure indication comprises an air pump body 10, and two pressure gauges 20;30 installed in an air pump body 10. One pressure gauge 20 is a low pressure gauge. The other pressure gauge 30 is a high pressure gauge. The pump head 40 of the air pump body 10 is rotatable so that the user can rotate the pump head 40 to the desired angle, facilitating viewing the low pressure gauge 20 or the high pressure gauge 30.

Figure 2:
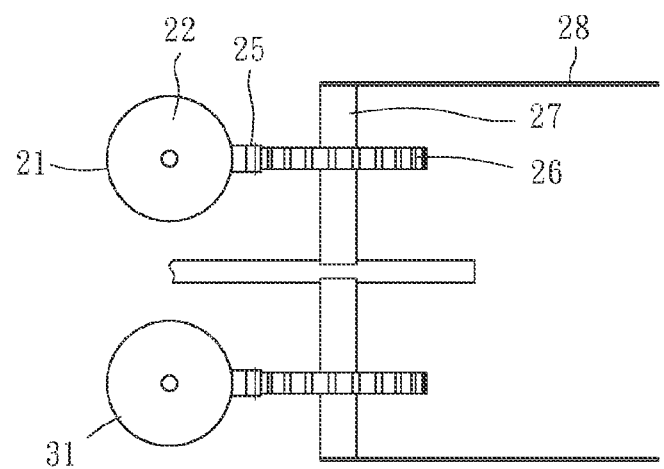
FIG. 2 is a schematic structural view of the first embodiment of the present invention.
Figure 3:
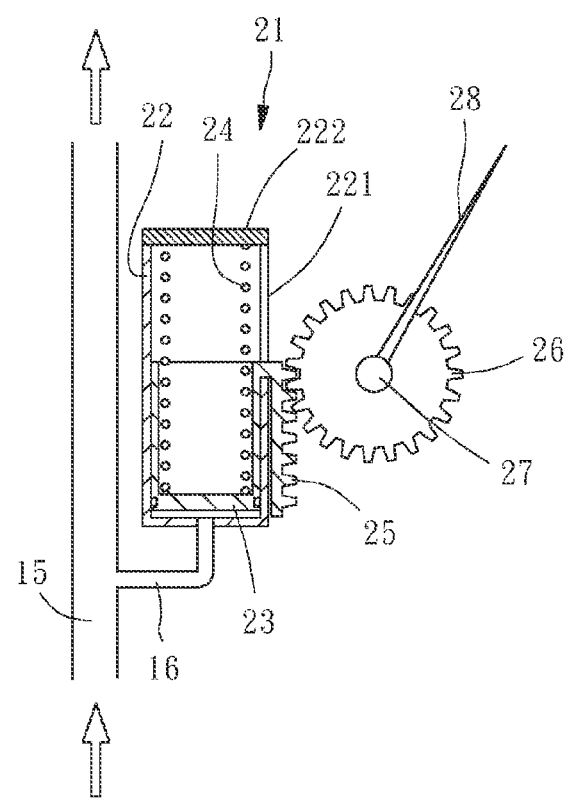
FIG. 3 is a schematic drawing illustrating the structure of the two pressure measuring devices of the air pump with two pressure gauges for high/low pressure indication in accordance with the first embodiment of the present invention is shown.

As illustrated in FIG. 2, a schematic structural view of the two pressure gauges of the air pump with two pressure gauges for high/low pressure indication in accordance with the present invention is shown, in which, reference number 31 indicates a high pressure measuring device; reference number 21 indicates a low pressure measuring device. These two pressure measuring devices 21;31 have the same structure. The low pressure measuring device 21 is used as an example for explanation. As illustrated in FIG. 3, the low pressure measuring device 21 comprises a piston tube 22 defining a longitudinal sliding slot 221 at one lateral side thereof, a piston 23 movably accommodated in the piston tube 22, a spring 24 mounted in the piston tube 22 and having its one end stopped against the piston 23 and its other end stopped against a bottom wall 222 of the piston tube 22, a toothed rack 25 mounted on the outside wall of the piston tube 22 and fixedly connected to the piston 23 and movable along the longitudinal sliding slot 221, a gear 26 meshed with the toothed rack 25, a shaft 27 fixedly located at the center of the gear 26, and a indicator 28 fixedly mounted at the top end of the shaft 27. The pressure gauge 20 further comprises a dial 29 (see FIG. 1) marked with a graduated scale. The indicator 28 is suspending above the dial 29 and rotatable with the gear 26 to indicate the pressure value. The reference number 15 in FIG. 3 indicates a charge-flow passage. During operation of the air pump, the pumped air goes through the charge-flow passage 15 into the pump head 40. The pump head 40 is connectable to an air valve or ball needle of an inflatable object (for example, tire). The reference number 16 in FIG. 3 indicates a manifold that guides the pumped air from the charge-flow passage 15 to the piston tube 22, forcing the piston 23 to move in the piston tube 22 and to simultaneously drive the toothed rack 25 to rotate the gear 26. The difference between the two pressure measuring devices 21;31 is the capacity of the spring 24. According to this embodiment, pressure measuring device 21;31 are arranged at different elevations in a parallel manner. Alternatively, the pressure measuring device 21;31 can be arranged in a staggered manner.

Figure 4:
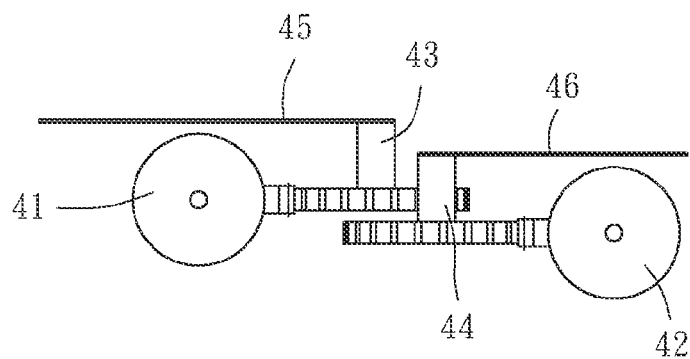
FIG. 4 is a schematic structural view of an air pump with two pressure gauges for high/low pressure indication in accordance with a second embodiment of the present invention is shown.
Figure 5:
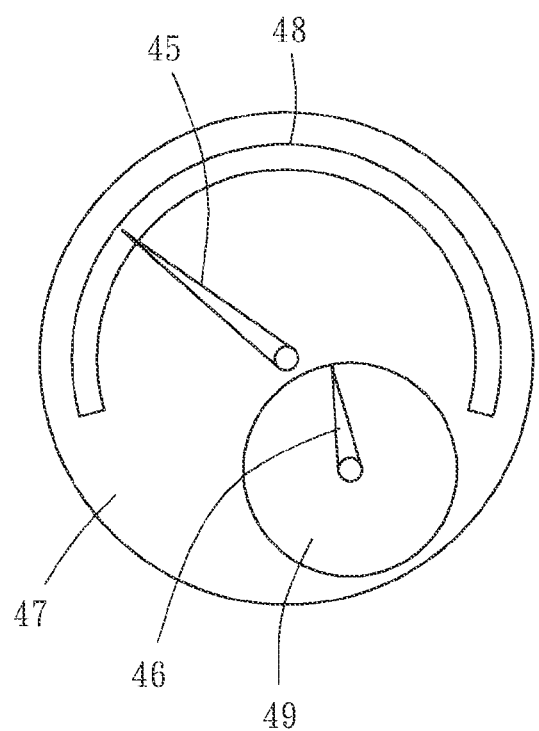
FIG. 5 is a schematic view of a part of the second embodiment of the present invention, illustrating the arrangement of the dial.

Referring to FIGS. 4 and 5, an air pump with two pressure gauges for high/low pressure indication in accordance with a second embodiment of the present invention is shown. According to this second embodiment, the high and low pressure measuring devices 41;42 are arranged at different elevations in a staggered manner; the shafts 43;44 and the indicators 45;46 are disposed at the same side and use a common dial 47; the dial 47 defines a high pressure indication zone 48 and a low pressure indication zone 49; the two indicators 45;46 indicate the high pressure indication zone 48 and the low pressure indication zone 49 respectively. This alternate form simply uses one single dial, facilitating the use of the air pump.

Figure 6:
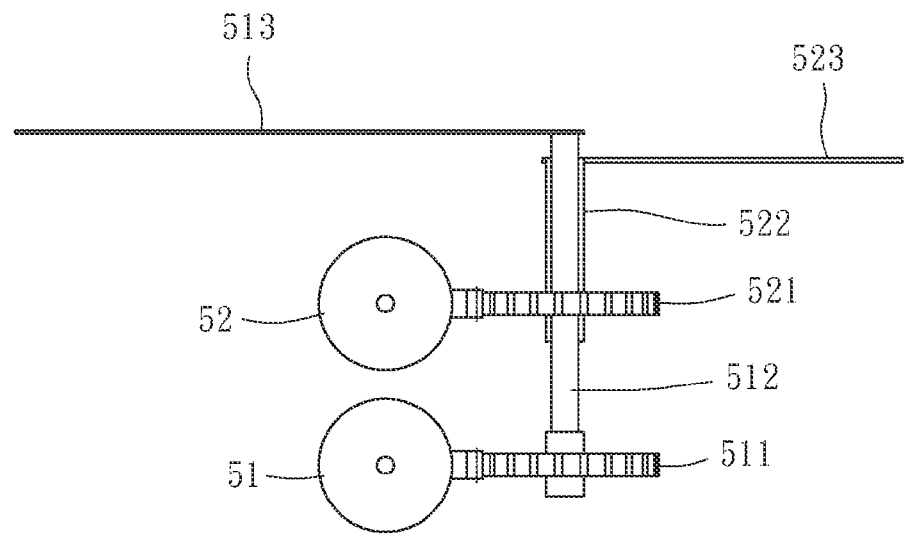
FIG. 6 is a schematic structural view of an air pump with two pressure gauges for high/low pressure indication in accordance with a third embodiment of the present invention is shown.
Figure 7:
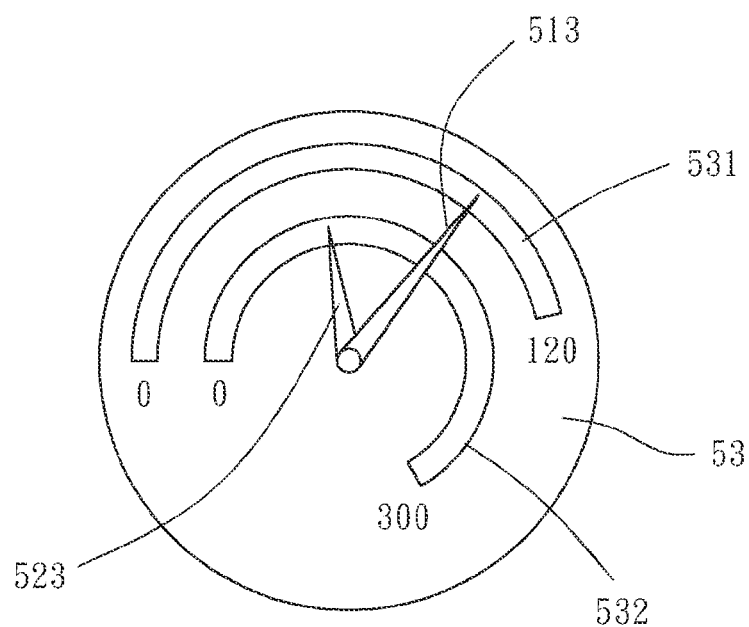
FIG. 7 is a schematic view of a part of the third embodiment of the present invention, illustrating the arrangement of the dial.
Figure 10:
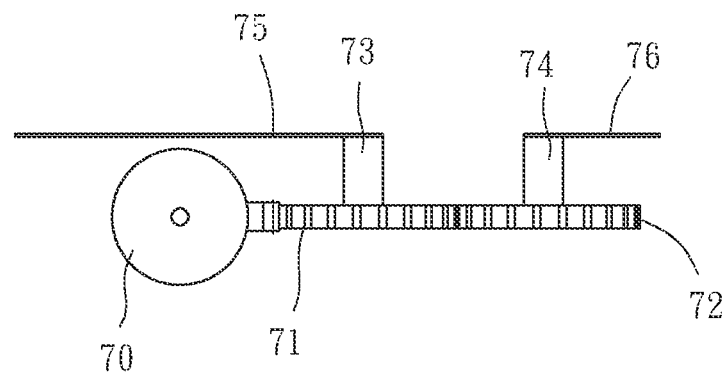
FIG. 10 is a schematic structural view of an air pump with two pressure gauges for high/low pressure indication in accordance with a fifth embodiment of the present invention is shown.

Referring to FIGS. 6 and 7, an air pump with two pressure gauges for high/low pressure indication in accordance with a third embodiment of the present invention is shown. According to this third embodiment, the high and low pressure measuring devices 51;52 use a common dial 53; the gear 521 of the high pressure measuring device 52 can rotate a tube shaft 522 and an indicator 523 that is mounted at the tube shaft 522; the gear 511 of the low pressure measuring device 51 can rotate a rod shaft 512 and an indicator 513 that is mounted at the rod shaft 512; the rod shaft 512 is inserted through the tube shaft 522. The arrangement of the two indicators 513;523 is similar to the arrangement of the minute hand and hour hand of a clock. Further, the dial 53 has two arched graduated scales 531;532 marked thereon. The outer arched graduated scale 531 is a low-pressure graduated scale for the pressure range 0 psi to 120 psi. The inner arched graduated scale 532 is a high-pressure graduated scale for the pressure range 0 psi to 300 psi. The tow-pressure indicator 513 is relatively longer and adapted to indicate the low-pressure graduated scale 531. The high-pressure indicator 523 is relatively shorter and adapted to indicate the high-pressure graduated scale 532.

During a pressure measuring operation, the low-pressure indicator 513 is rotated at a relatively higher speed, and the high-pressure indicator 523 is rotated at a relatively lower speed. In FIG. 7, the low-pressure indicator 513 and the low-pressure graduated scale 531 indicate the same reading, i.e., 100 psi. During this pumping operation, the low-pressure indicator 513 and the high-pressure indicator 523 are respectively rotated from the 0 psi indication position to the 100 psi indication position. In this case, the speed of rotation of the low-pressure indicator 513 is relatively faster and the angle of rotation of the low-pressure indicator 513 is relatively larger, facilitating viewing and reading the indication. If the pressure value is beyond the working range of the low pressure measuring device 51, the low pressure measuring device 51 will stop working, enabling the piston to be pushed to the bottom side of the piston tube and held in position. At this time, the indicator is stopped, and the spring is compressed to store an elastic potential energy. Once the pressure drops back to the normal working range, the spring returns to its original shape, enabling the low pressure measuring device to resume its normal operating state.

Referring to FIGS. 8 and 9, an air pump with two pressure gauges for high/low pressure indication in accordance with a fourth embodiment of the present invention is shown. According to this fourth embodiment, two springs, namely, the first spring 62 and the second spring 63 are arranged in the piston tube 61 of one pressure measuring device 60, wherein the first spring 62 is relatively longer, and the second spring 63 is relatively shorter. During a pumping operation of the air pump, the piston 64 is forced by the pumped air to compress the first spring 62 at first, and then to compress the second spring 63 and the first spring 62 after reached a predetermined compression distance. Therefore, the indicator 65 is rotated relatively faster in the first stage, and then rotated relatively slower in the second stage. Fitting this feature, the dial 66 defines an indication zone that is divided into two indication sections 67;68, wherein the first indication section 67 is a low-pressure indication section, for example, for the pressure range 0 psi to 120 psi; the second indication section 68 is a high-pressure indication section, for example, for the pressure range 120 psi to 300 psi. The scale ratios of the first indication section 67 and the second indication section 68 are different. As illustrated in FIG. 9, the first indication section 67 and the second indication section 68 have the same arc length, however, they both have a different number of divisions. During application, the indicator 65 is rotated relatively slower under a low pressure condition, and the graduated scale in the low pressure indication zone 67 is more obvious and can easily be viewed and read. This embodiment uses one single dial and one single indicator, wherein the dial defines an indication zone that is divided into a high-pressure indication section and a low-pressure indication section; the indicator will be rotated relatively faster at the first stage, and then rotated relatively slower after passed a predetermined set value. The structure of this fourth embodiment is substantially similar to the prior art design with the exception of the use of an extra spring and the arrangement of a two-section graduated scale on the dial. Thus, the structural design of this fourth embodiment is greatly simplified.

Figure 11:
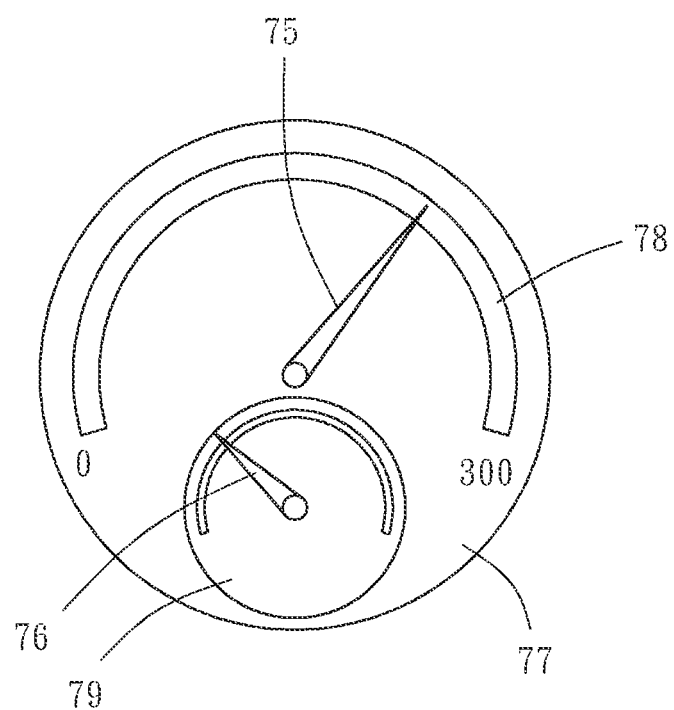
FIG. 11 is a schematic view of a part of the fifth embodiment of the present invention, illustrating the arrangement of the dial.
Figure 12:
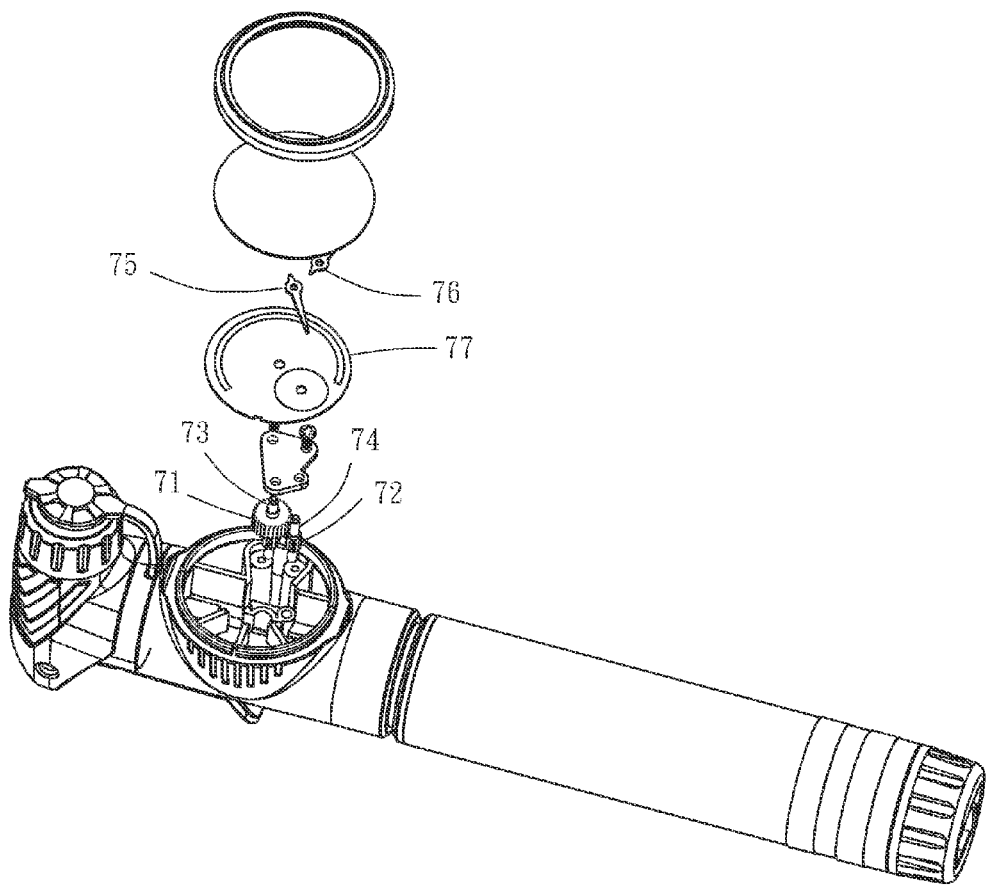
FIG. 12 is an elevational and partially exploded view of the air pump with two pressure gauges for high/low pressure indication in accordance with the fifth embodiment of the present invention is shown.
Figure 13:
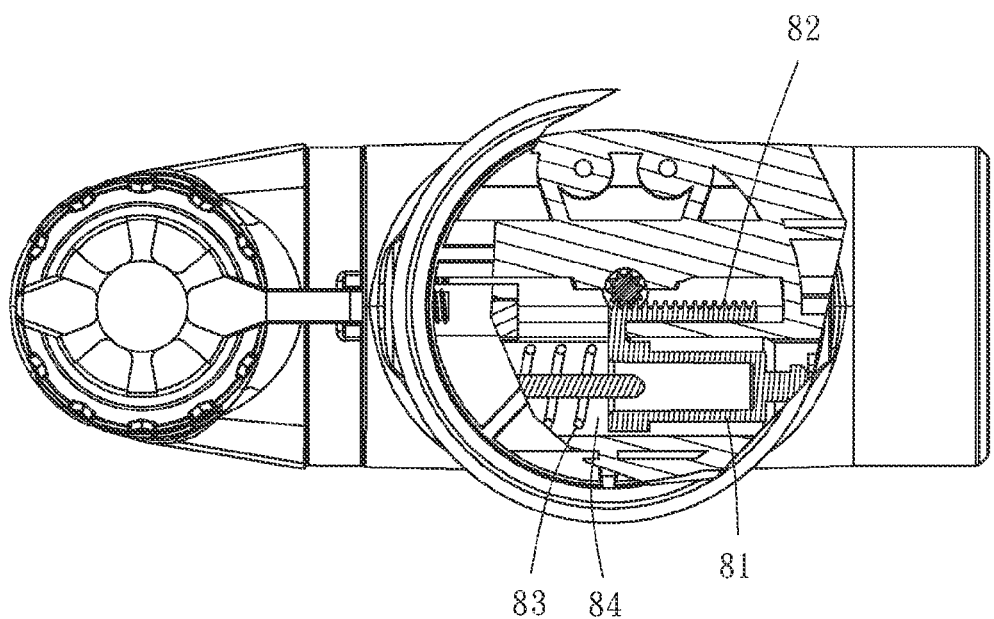
FIG. 13 is a sectional view, in an enlarged scale, of a part of the air pump with two pressure gauges for high/low pressure indication in accordance with the fifth embodiment of the present invention is shown.

Referring to FIGS. 10-13, an air pump with two pressure gauges for high/low pressure indication in accordance with a fifth embodiment of the present invention is shown. According to this fifth embodiment, the reference number 70 indicates a pressure measuring device, which comprises a dial 77 having an arched high pressure indication zone 78 and a circular low pressure indication zone 79 marked thereon, a first gear 71, a second gear 72 directly or indirectly rotatable by the first gear 71, a first indicator 75 mounted at the first gear 71 and adapted to indicate the arched high pressure indication zone 78, and a second indicator 76 mounted at the second gear 72 and adapted to indicate the circular low pressure indication zone 79. As illustrated in FIG. 11, the dial, referenced by 77, has an arched high pressure indication zone 78 and a circular low pressure indication zone 79 marked thereon. Thus, two indicators are arranged above the dial for high pressure indication and low pressure indication respectively. FIG. 12 is an elevational and partially exploded view of the fifth embodiment of the present invention. FIG. 13 is a sectional view of the fifth embodiment of the present invention, illustrating the arrangement of the piston 81, the toothed rack 82, the spring 83 and the piston tube 84. According to this fifth embodiment, the first indicator (low-pressure indicator) 75 is synchronously rotated with the second indicator (high-pressure indicator) 76; the speed of rotation of the first indicator (low-pressure indicator) 75 is determined subject to the gear ratio between the first gear 71 and the second gear 72. The first indicator (low-pressure indicator) 75 may be rotated in the circular low pressure indication zone over one run, however, this condition does not affect the indication of the first indicator (low-pressure indicator) 75 in the initial pumping stage.

As stated above, the air pump with two pressure gauges for high/low pressure indication in accordance with the present invention is effective for high pressure indication as well as for low pressure indication during a pumping operation, enabling the user to read the readings conveniently even during a tow pressure stage.

What is claimed is:

1. An air pump, comprising an air pump body for pumping air, and a pressure gauge unit for measuring and indicating the air pumped by said air pump body, said pressure gauge unit comprising a high pressure gauge and a low pressure gauge mounted in said air pump body;

wherein said pressure gauge unit further comprising a dial marked with graduated scale means for high pressure indication and low pressure indication, a high pressure measuring device installed in said high pressure gauge, a low pressure measuring device installed in said low pressure gauge, a high pressure indicator suspending above said dial and rotatable by said high pressure measuring device, and a low pressure indicator suspending above said dial and rotatable by said low pressure measuring device;

wherein said high pressure measuring device and said low pressure measuring device each comprise a piston tube defining a longitudinal sliding slot at one side thereof, a piston movably accommodated in said piston tube, a spring having one end thereof stopped against said piston and an opposite end thereof stopped against a bottom wall of said piston tube, a toothed rack disposed outside said piston tube and fixedly connected to said piston and movable along said longitudinal sliding slot, and a gear meshed with said toothed rack; said high pressure indicator and said low pressure indicator are respectively fixedly connected to the gear of said high pressure measuring device and the gear of said low pressure measuring device.

2. The air pump as claimed in claim 1, wherein said high pressure measuring device further comprises a tube shaft affixed to the gear thereof and holding said high pressure indicator for synchronous rotation; said low pressure measuring device further comprises a rod shaft affixed to the gear thereof and inserted through said tube shaft of said high pressure measuring device and holding said low pressure indicator for synchronous rotation; said graduated scale means of said dial comprises two arched graduated scales configured for high pressure indication and low pressure indication respectively.

3. An air pump, comprising a pressure measuring device for measuring and indicating a pumped air, a dial defining a high pressure indication zone and a low pressure indication zone, a gear set rotatable by said pressure measuring device, and a first indicator and a second indicator respectively connected to said gear set and respectively rotatable by said gear set over said dial to indicate one of said high pressure indication zone and said low pressure indication zone;

wherein said gear set comprises a first gear, a first shaft fixedly mounted at the center of said first gear, a second gear meshed with said first gear, and a second shaft fixedly mounted at the center of said second gear; said high pressure indication zone is an arched high pressure indication zone; said low pressure indication zone is a circular low pressure indication zone; said first indicator mounted at said first shaft and adapted to indicate said arched high pressure indication zone; said second indicator is mounted at said second shaft and adapted to indicate said circular low pressure indication zone.

4. An air pump, comprising a pressure measuring device, an indicator and a dial, wherein said dial comprises an arched graduated scale marked thereon, said arched graduated scale being divided into a high pressure indication zone and a low pressure indication zone; said pressure measuring device comprises a relatively longer first spring and a relatively shorter second spring and is drivable by a pumped air to compress said relatively longer first spring and then to compress said relatively longer first spring and said relatively shorter second spring after reaching a predetermined compression distance; said indicator is rotatably suspended above said dial and adapted to indicate said arched graduated scale, and said indicator is drivable by said pressure measuring device to rotate initially at a relatively higher speed and then at a relatively lower speed, said indicator indicating said low pressure indication zone when rotated by said pressure measuring device at said relatively higher speed, said indicator indicating said high pressure indication zone when rotated by said pressure measuring device at said relatively lower speed;

wherein said pressure measuring device further comprises a piston tube, and a piston movably accommodated in said piston tube; said relatively longer first spring and said relatively shorter second spring are accommodated in said piston tube in series and stopped between said piston and a bottom wall of said piston tube in such a manner that when said piston is moved in said piston tube, said piston compresses said relatively longer first spring and then compresses said relatively longer first spring and said relatively shorter second spring after reaching a predetermined compression distance.

* * * * *